May 3, 1966  P. WILLEMS  3,249,310
APPARATUS AND METHOD FOR MIXING AND COMMINUTING MATERIALS
Original Filed Aug. 6, 1956  2 Sheets-Sheet 1
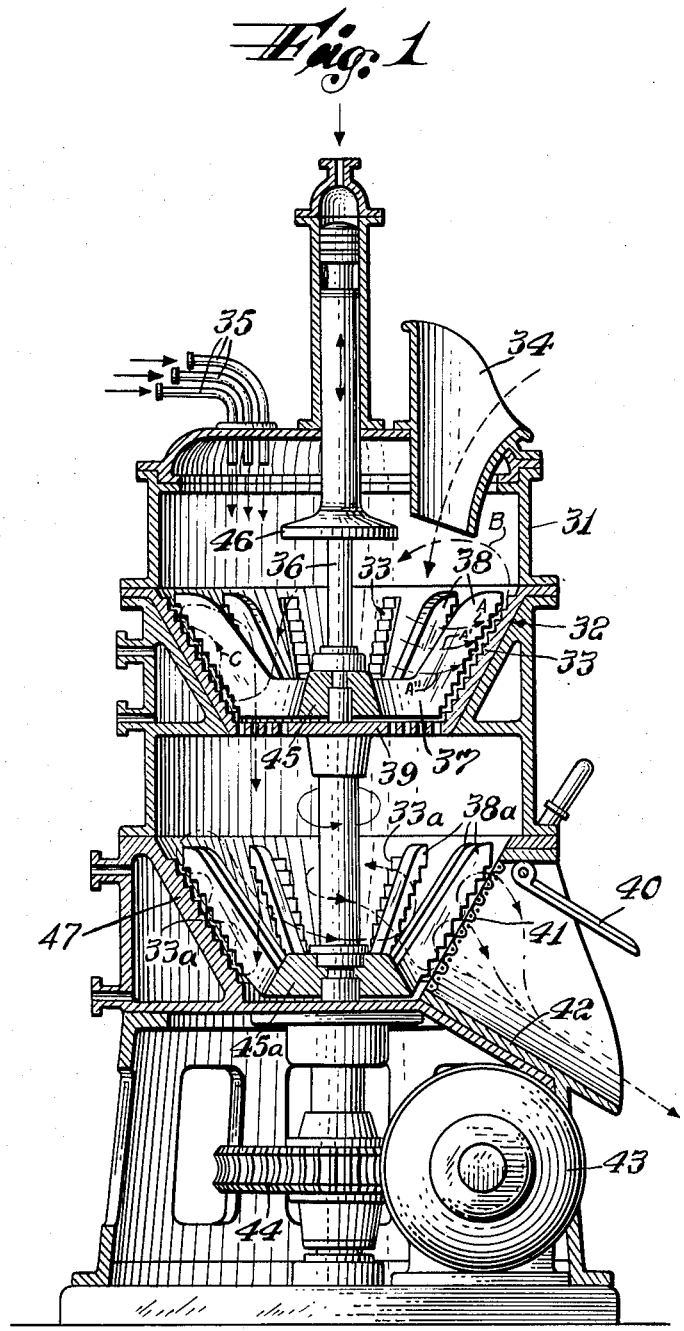
INVENTOR.
Peter Willems
BY

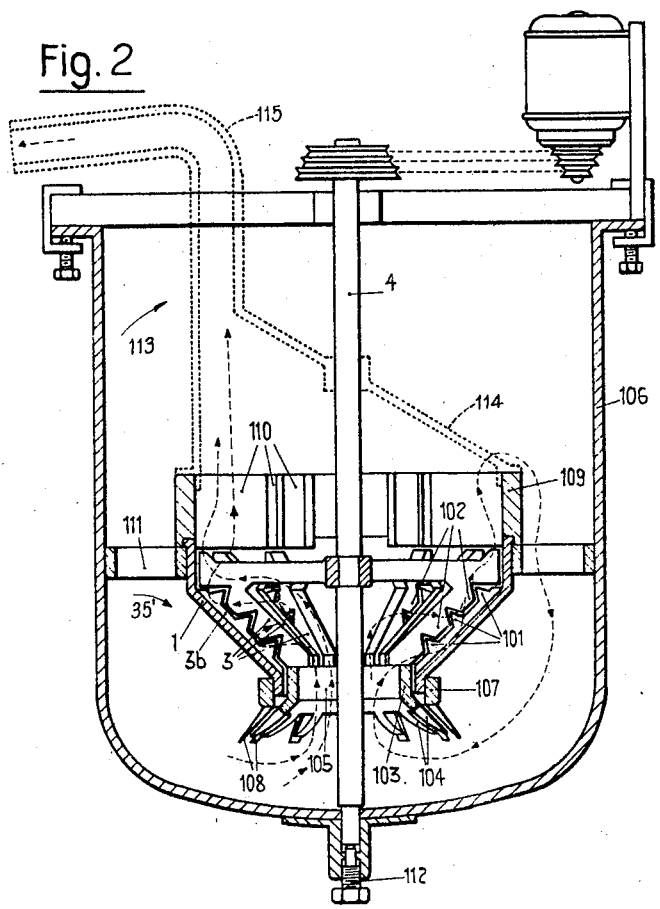

United States Patent Office 3,249,310
Patented May 3, 1966

3,249,310
APPARATUS AND METHOD FOR MIXING AND COMMINUTING MATERIALS
Peter Willems, 20–22 Steinhofhalde, Lucerne, Switzerland
Original application Aug. 6, 1956, Ser. No. 602,209, now Patent No. 3,054,565, dated Sept. 18, 1962. Divided and this application Aug. 7, 1962, Ser. No. 216,947
Claims priority, application Switzerland, Aug. 12, 1955, 23,103/55
5 Claims. (Cl. 241—29)

This invention relates to apparatus and a method for kneading, mixing, and comminuting materials. The present application is a division of my copending application Serial No. 602,209 filed August 6, 1956, now Patent No. 3,054,565, entitled, "Kneading and Mixing Apparatus."

There are kneading and mixing apparatus known, which have specific pumping means (blades) for feeding materal to be treated from the bottom of a rotor into an upwardly and outwardly inclined annular canal equipped with disintegrating members. The material is pumped only at the bottom of the rotor into said canal for treatment and has then to rise in the relatively narrow canal in the direction of the longitudinal extent of the disintegrating members without further treatment. Thus, only a layer of the material just above the bottom of the container is involved in the mixing or comminuting operation. Heavy particles of the material are pumped upwardly through the canal and may fall untreated towards the center of the container space after having left the upper or outlet end of the canal, and will float on the surface of the material, due to the slow circulation of the material, until they are again brought near to the inlet opening of the canal.

The primary object of my present invention is to provide an improved apparatus and an improved method for mixing and comminuting materials.

The mixing and comminuting apparatus according to this invention differs basically from the referred to known devices in that material to be treated is admitted transversely of the longitudinal extent of disintegrating members to the whole longitudinal extent of a working space or working gap of the apparatus. The material is thrown outwardly from a central space simultaneously on all levels thereof by the disintegrating member or members used, disintegrated and thoroughly mixed or reacted in the working gap, and finally longitudinally conveyed through the working gap in form of a uniform mixture, so that material in a mixed and homogenized condition will return to the aforesaid central space for another cycle of treatment. While in prior construction, each particle of material to be treated was forced to flow through the whole length or height of a narrow canal, I provide that the material moves transversally, as has been indicated, from every point of a central place into a working gap. Specific pumping members can be dispensed with because the pumping action is effected by the disintegrating members themselves. Similarly, the method of my invention provides treating the material throughout the height or length of the working space.

By means of the apparatus and method according to the present invention materials of any kind, that is, solid, elastic, plastic materials, liquids of any viscosity, and gaseous materials, may be treated separately or in any desired combination and mixture. Physical effects, such as pressing, tearing, shredding, shearing, kneading, rubbing, grating, beating, solving, mixing, cavitation, homogenizing, at controllable speed and frequency, and under heating or cooling when desired, are produced. Electrical energy may be conducted through the material during treatment in the apparatus, whereby electrical terminals are provided on the container and rotor. The container and rotor constitute electrically isolated treating electrodes. Chemical reactions or other chemical effects may be achieved as well during the treatment of materials according to this invention.

The specification is accompanied by drawings which illustrate the apparatus of the invention by way of example and in which:

FIG. 1 shows a sectional elevation of a multistage mixing and comminuting apparatus embodying features of the present invention; and FIG. 2 shows an axial section of a modification.

Referring to the drawings in greater detail, and initially to FIG. 1, the apparatus shown has two working stages and thus consists of two units of a mixing and comminuting apparatus, the units being arranged one above the other. The container wall of the upper unit has a bell-shaped portion 31 which is open at its upper end but can be closed, and serves together with the lower portion 32 of the container wall of the upper unit as a stator. The lower portion 32 is conically shaped and has toothed ribs 33. The container 31, 32 is closed by means of a cover, and a hopper 34 and inlet tubes 35 are inserted through the cover to open into the container 31, 32. A shaft 36 is rotatably mounted in the axis of the container, a star-shaped body 37 with toothed arms 38 being fixed on the shaft 36. A bottom 39 of the container 31, 32, which may be removably inserted for easy exchange thereof, is perforated.

When material is filled from above into the container 31, 32, it falls between the arms 38 against the inside of the wall portion 32. When the star-shaped body 37 with its arms 38 is subsequently rotated, material on all levels is pressed by the centrifugal force acting on it between the arms 38 against the inside of the wall portion 32, and is disintegrated and mixed to a homogeneous mass. In FIG. 1, the arrows A, A' and A'' are explanatory of the simultaneous movement of the material on all levels of the longitudinal extent of the arms 38 toward and into the working gap of the apparatus on the inside of the wall portion 32. The arrow B indicates the way of the homogeneous mixture as it leaves the working gap and returns to the central space. The flow line C indicates that some material, before it can move upwardly, returns, due to the creation of local and temporary overpressures and turbulence conditions within the working gap, from the working gap to the central space to be newly thrown back into the working gap. On the side facing the wall portion 32, the arms 38 are provided with teeth. Similar teeth are provided on the ribs 33 of the wall portion 32. When the material has sufficiently been disintegrated and homogenized and its particles will be ready to pass through the perforation of the bottom 39, or when the material has turned sufficiently liquid, the material will flow through the bottom perforations into the lower unit.

Thus, treated and disintegrated material will fall into the space within the container wall 47 of the lower unit, that is, into the star-shaped bell or central space formed by toothed arms 38a of the lower stage of the apparatus, in which the material is further treated between the arms 38a and toothed container ribs 33a until the desired state of disintegration is reached. As soon as this state is reached, the closure 40 is opened so that the material may flow out through a screen 41 in the container wall 47 and through an outlet duct 42. The container wall 47 serves as stator. The screen 41 may be of fine mesh and may serve as a filter, e.g., for extraction of a solid component from a liquid component. The screen may be exchangeable.

The apparatus as shown in FIG. 1, which, however, may have more than two stages of similar or different construction, may, if desired, be adapted for continuous and fully automatic operation, whereby untreated material and possible additions to the same are continously supplied through the hopper 34 and/or the pipes 35, and the treated material leaves the apparatus at a suitable speed through the mesh of the screen 41 and the outlet conduit which is adjustable by the controllable closure 40. From the drawing it will be seen that the ribs 33 and 33a extend in directions assumed by the generatrix of the container body 32.

The apparatus is driven from a motor 43 over a variable speed transmission, a worm gear 44, and a central shaft 36 on which bodies 45 and 45a with the arms 38 and 38a, respectively, are fixed.

In order that very resistant material may be brought into the working zone of the disintegrating arms 38 and the ribs 33 and axially displaceable pressing ram 46 is provided by means of which the material below it may be pressed between the arms 38.

FIG. 2 shows an embodiment of an apparatus for practicing this invention, which includes a container 35' placed in a larger container 106 to be coaxially therewith. The container 35' is confined by a side wall and is open at opposite ends. The side wall includes a conical portion 1 on the inside of which there extend toothed ribs 3b. On a rotatably mounted shaft 4 which extends in the axis of the two containers, arms 3 are spacedly mounted by means of a hub and spokes. The arms 3 form a part of the rotor of the apparatus whereas the container 35' constitutes the stator. The ribs 3b are provided with sharp knives or teeth 101 whereby such teeth on the same level form circular rows. Bladelike teeth 102 provided on the arms 3 project between two adjacent rows of teeth 101.

The lower ends of the arms 3 are connected to a ring 103 which carries disintegrating tools 104 for a preliminary disintegration of material that enters the container 35' through the open end on the bottom. The tools 104 rotate with the arms 3 while the apparatus is in operation. A ring 107 is secured to the edge of the container 35' at the lower open end 105 thereof. The ring 107 carries tools 108 which are intended and adapted to cooperate with the tools 104.

A hollow cylinder 109 is provided at the upper open end of the container 35' on the inside of which there are guide blades 110.

The container 35' is supported in the container 106 by means of a supporting member 111 which consists of radially disposed bars leaving openings between them for the passage of treated material.

Underpressure produced by the rotating arms 3 inside the container 35' may be used for sucking material susceptible of being pumped through the opening 105 to be treated within the whole height of the axial extent of the container wall portion 1 and the arms 3. The material is thrown radially outwardly, as is indicated by flow lines, and is most effectively disintegrated by the cooperation of the bladelike teeth 102 and the teeth 101. Due to the pumping action of the arms 3, the material assumes first a circulating movement which, however, is changed by the blades or vanes 110 into a movement in approximately axial upward direction. The material leaving the hollow cylinder 109 at its upper end moves on to complete a cycle, also shown, and to start a new cycle. Very large particles of the material to be treated, which cannot pass through the inlet opening 105, are reduced to smaller sizes by the tools 104 and 108 so that they will freely enter the container 35' to be fully disintegrated.

The driving shaft 4 with the disintegrating arms fixed thereon may be displaced in axial direction, for instance, with the aid of a screw 112, in order to adjust the play between the rotating and stationary disintegrating elements to a given material or given requirements.

The apparatus of my present invention may be used in various forms and sizes. When using two rotating bodies in one and the same unit, the inner rotating body may, for instance, be equipped with two or one disintegrating members or arms, while the outer disintegrating body may be equipped with a higher number of arms and/or the respective container wall may be equipped with a higher number of ribs or other projections. For other purposes, the rotating arms may cooperate with a smooth inside surface of the container wall. The arms may removably be attached to a hub or the driving shaft in order to change the number of effective arms and/or the distance between adjacent arms. It may be of advantage to provide different distances between the arms. The container wall and/or the rotating arms may be provided with bores, depressions, or other recesses which may produce mechanical pulses up to highest frequencies (supersonic frequencies) when recesses or projections pass by. The apparatus according to this invention may be mounted on or in any other device when desired. It may be operated in any desired position, for instance, in horizontal position, whereby the untreated material is fed into the container under pressure. The apparatus may also operate with the inlet for the untreated material on top and with the outlet for the treated material at the bottom, in which case the material to be treated is fed through the apparatus under pressure. The apparatus may be tiltable. Further, a number of operating stages may be disposed one behind the other in a pipe or tube, whereby the disintegrating members of successive stages are so designed that the material is successively more and more disintegrated.

In the case of FIG. 2, the pumping effect obtained by the action of the rotating disintegrating member and its cooperation with the surrounding container 35' may be used for emptying the container 106 through conduit means designated 113 in FIG. 2. For instance, the cylinder 109 is shown to be provided with an upward extension 114 within the large container 106 and which terminates in a draining pipe 115 that passes through a removable cover of the container 106.

While the invention has been described and illustrated with reference to two specific embodiments thereof, it will be understood that other embodiments may be resorted to without departing from the invention. Therefore, the forms of the invention, shown in the drawings and described hereinbefore, are to be considered as illustrative and not as limiting the scope of the following claims.

I claim:

1. A multistage mixing and comminuting apparatus comprising at least two units, one of said units being arranged above the other, each of said units including a container having an upwardly widening conical portion, said portion having a side wall, each unit further including a drive shaft mounted to extend coaxially with said container, arms spacedly supported by said shaft for rotation, said arms defining, when rotating, a central space within said container and having flanks and outer faces, said outer faces extending in a spaced but cooperating relationship with respect to, and along the longitudinal extent of, the inner face of said side wall, the peripheral spaces between said outer faces and said inner face being accessible over substantially the whole longitudinal extent of said outer faces to material to be treated, when moving from said central space toward said inner face, said flanks, with the apparatus in operation, acting upon material in said central space at every level thereof to propel same outwardly, and comminuting means provided on said inner face, said outer faces cooperating with said comminuting means to perform a comminuting action, said upper unit being provided with a perforated bottom.

2. In the apparatus according to claim 1, a ram centrally provided in at least a single unit, the ram being mounted to be axially displaceable.

3. In the apparatus according to claim 1, at least a portion of the side wall of the container of at least a single unit being perforated.

4. In a method of mixing and comminuting materials, feeding materials to be treated into an axially extending central zone, propelling said material substantially on all levels of said central zone in radial outward directions into a coaxially provided material-treating zone annularly surrounding said central zone and being defined by stator means and rotating rotor means, said central and material-treating zones communicating with each other substantially on all levels of both of said zones, said stator and rotor means being at least partly of conical shape, said material-treating zone being of conical shape, subjecting said material, while in said material-treating zone, throughout the axial extent of said material-treating zone to the action of material-treating elements, spirally moving said material in said material-treating zone in a direction toward the wider end thereof, returning treated material from said material-treating zone to said central zone, again radially propelling returned material substantially on all levels of said central zone into said material-treating zone, again spirally moving said returned material toward said wider end of said material-treating zone, again carrying out the treatment of said returned material throughout the axial extent of said material-treating zone, and repeating the cycles of said outward movement, said treatment, said spiral movement, and return movement.

5. In the method according to claim 4, said central and material-treating zones being defined at their bottoms by a perforated bottom, discharging said repeatedly treated material through said bottom into a second axially extending central zone, said first and second named central zones being in an end to end alignment, propelling material substantially on all levels of said second central zone in radial outward directions into a coaxially provided second material-treating zone annularly surrounding said second central zone and being defined by second stator and second rotating rotor means, said second central and material-treating zones communicating with each other substantially on all levels of both of said second zones, said second stator and rotor means being at least partly of conical shape, said second material-treating zone being of conical shape and being defined by an at least partly perforated side wall, subjecting the material in said second material-treating zone, throughout the axial extent thereof, to the action of material-treating elements, carrying out spiral and return movements within said second zones, repeating the cycles within said second zones, and discharging fully treated material through said perforated side wall.

References Cited by the Examiner

UNITED STATES PATENTS

| | | | |
|---|---|---|---|
| 1,915,862 | 6/1933 | Morden | 241—97 X |
| 1,951,684 | 3/1934 | Wells | 241—97 X |
| 1,977,955 | 10/1934 | Robinson | 241—257 |
| 2,012,680 | 8/1935 | Hammes | 241—257 X |
| 2,078,565 | 4/1937 | Durst et al. | |
| 2,181,571 | 11/1939 | Stearns | 241—76 |
| 2,390,579 | 12/1945 | Fritzberg | 241—97 X |
| 2,461,720 | 2/1949 | Cawood et al. | 241—46 X |
| 2,541,221 | 2/1951 | Edwards. | |
| 2,661,666 | 12/1953 | Knoll. | |
| 2,749,814 | 6/1956 | Haug | 241—257 X |

LESTER M. SWINGLE, *Primary Examiner.*

J. SPENCER OVERHOLSER, *Examiner.*

H. F. PEPPER, JR., *Assistant Examiner.*